(12) United States Patent
Klochkov et al.

(10) Patent No.: US 9,167,676 B2
(45) Date of Patent: Oct. 20, 2015

(54) LINEAR IONIZING BAR WITH CONFIGURABLE NOZZLES

(71) Applicants: Aleksey Klochkov, San Francisco, CA (US); Peter Gefter, S. San Francisco, CA (US); Steven Bernard Heymann, Los Gatos, CA (US)

(72) Inventors: Aleksey Klochkov, San Francisco, CA (US); Peter Gefter, S. San Francisco, CA (US); Steven Bernard Heymann, Los Gatos, CA (US)

(73) Assignee: Illinois ToolWorks Inc., Glenview, IL (US)

( * ) Notice: Subject to any disclaimer, the term of this patent is extended or adjusted under 35 U.S.C. 154(b) by 10 days.

(21) Appl. No.: 14/194,121

(22) Filed: Feb. 28, 2014

(65) Prior Publication Data

US 2015/0250044 A1    Sep. 3, 2015

(51) Int. Cl.
*H05F 3/00* (2006.01)
*H05F 3/04* (2006.01)
*H05F 3/06* (2006.01)

(52) U.S. Cl.
CPC ........................................ *H05F 3/06* (2013.01)

(58) Field of Classification Search
CPC ............. H01T 23/00; H05F 3/06; H05F 3/04
USPC ......................................................... 361/213
See application file for complete search history.

(56) References Cited

U.S. PATENT DOCUMENTS

| | | | |
|---|---|---|---|
| 4,442,356 A | 4/1984 | Ludwick et al. | 250/324 |
| 6,330,146 B1* | 12/2001 | Blitshteyn et al. | 361/220 |
| 7,057,130 B2 | 6/2006 | Gefter et al. | 219/121.36 |
| 7,679,026 B1 | 3/2010 | Gefter et al. | 219/121.52 |
| 7,697,258 B2* | 4/2010 | Vernitskiy et al. | 361/230 |
| 7,821,762 B2 | 10/2010 | Yasuoka et al. | 361/212 |
| 7,822,355 B2 | 10/2010 | Schlitz | 399/100 |
| 8,038,775 B2 | 10/2011 | Gefter | 96/63 |
| 8,174,814 B2 | 5/2012 | Yasuoka et al. | 361/230 |
| 8,492,733 B1 | 7/2013 | Klochkov et al. | 250/423 R |

(Continued)

FOREIGN PATENT DOCUMENTS

WO     WO 03/100932     12/2008

OTHER PUBLICATIONS

PCT Application PCT/US2012/033278, Notification of . . . , International Search Report and Written Opinion of the International Searching Authority, mailed Sep. 14, 2012; 13 pages total.

(Continued)

*Primary Examiner* — Dharti Patel
(74) *Attorney, Agent, or Firm* — The Patent Source

(57) ABSTRACT

Ionizing bars for delivering charged carriers to charge neutralization target objects may include an ion emitter for establishing an ion cloud of charge carriers in response to application of an ionizing voltage. Disclosed bars may also include a reference electrode that presents a non-ionizing electric field to urge ions to move away from the ion emitter. The disclosed bars may also include a manifold. The manifold may receive and divide gas into plural gas streams directed past the ion emitter in a pattern to thereby urge charge carriers toward the target. The manifold may have plural apertures with nozzled inserts received therein. At least some of the inserts may have at least one aperture through which gas may flow and the nozzle inserts may collectively direct the divided gas streams away from the manifold and toward the target in one or more predetermined patterns.

24 Claims, 17 Drawing Sheets

(56) References Cited

U.S. PATENT DOCUMENTS

| | | | |
|---|---|---|---|
| 2008/0199208 A1 | 8/2008 | Schlitz | 399/100 |
| 2009/0116162 A1* | 5/2009 | Onezawa et al. | 361/213 |
| 2010/0008010 A1* | 1/2010 | Orihara et al. | 361/213 |
| 2012/0224293 A1 | 9/2012 | Partridge et al. | 361/230 |
| 2013/0299717 A1 | 11/2013 | Fukada | 250/426 |

OTHER PUBLICATIONS

Webpages from LIROS website, ten sheets, date unknown, available online at http://www.liroselectronic.com.

PCT Application PCT/US2014/066289, Notification of . . . , International Search Report and Written Opinion of the International Searching Authority, mailed May 27, 2015; 9 pages total.

\* cited by examiner

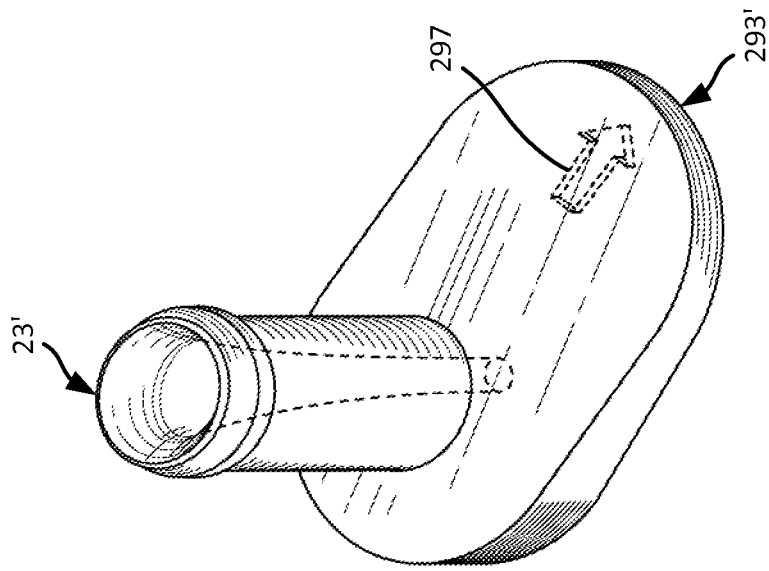
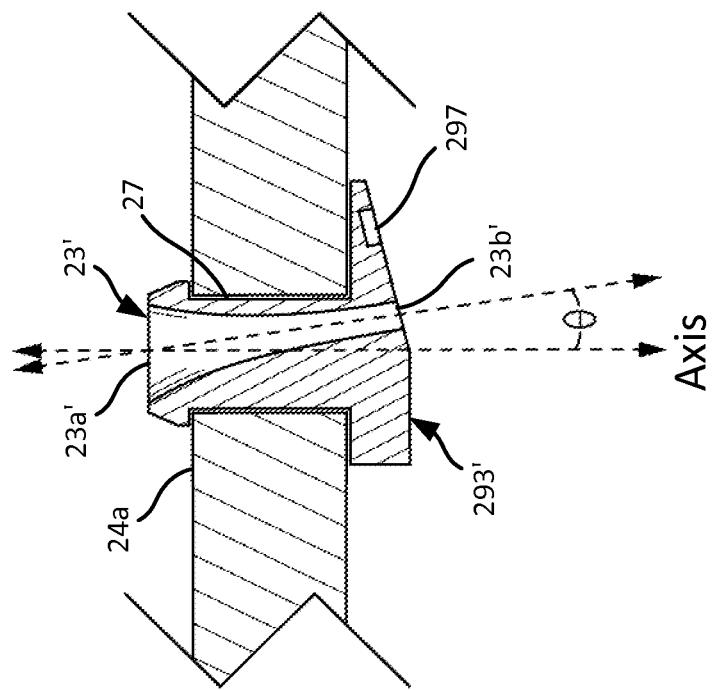
Figure 3G
Figure 3F

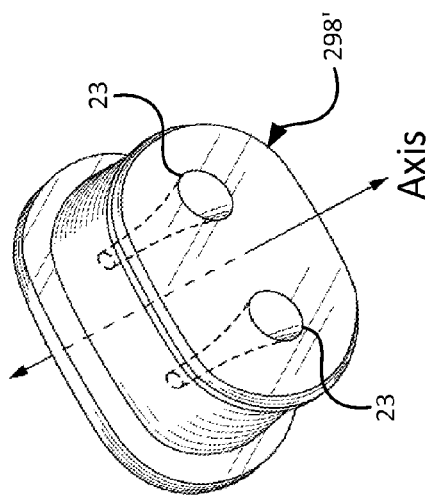
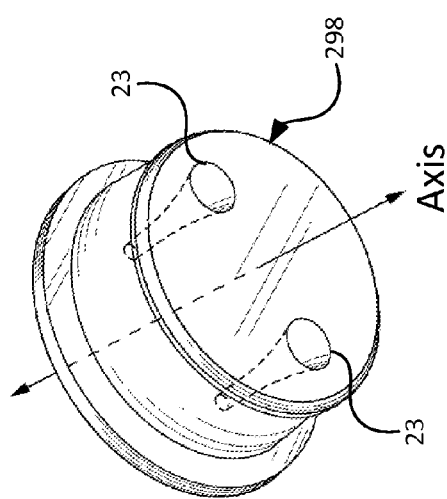
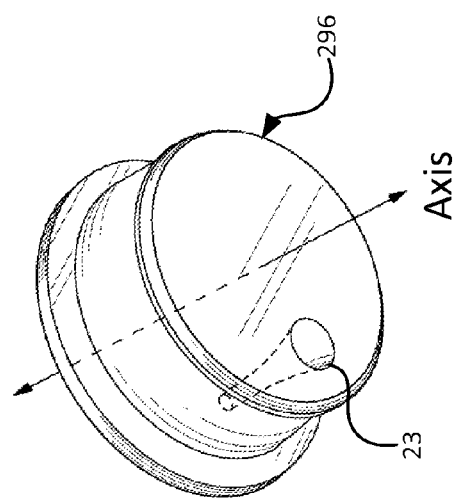
Figure 7B
Figure 7A
Figure 6A

LINEAR IONIZING BAR WITH CONFIGURABLE NOZZLES

BACKGROUND OF THE INVENTION

1. Field of the Invention

The present invention is directed to linear ionizing bars and other corona discharge based ionization systems, processes and apparatus that use gas flow to direct charge carriers to a target. The invention is particularly useful in (but not limited to) Flat Panel Display (FPD) industrial applications. Accordingly, the general objects of the invention are to provide novel systems, methods and apparatus of such character.

2. Description of the Related Art

Conventional static neutralization systems are usually composed of: (1) a bar type ionization cell having a group of pointed emitters and non-ionizing reference electrode(s); (2) a clean gas supply system having a group of jet type nozzles surrounding each ion emitter and connected to an gas channel; and (3) a control system with an AC or pulsed AC high voltage power supply connected to the ionization cell.

Charge neutralization may entail neutralization of large charged objects at relatively close distances and at rapid throughput rates. For example, the front and back of glass panels having a length and a width exceeding 3000 mm may need to be charge-neutralized wherein the distance between an ionizing bar(s) and the display panels usually ranges from 50-100 mm up to 1000 mm or more, and wherein the display panels are transported at high speeds using robotics systems.

The use of traditional charge-neutralization ionizing bars of the type described above presents several deficiencies/drawbacks/limitations in trying to satisfy the above-described demanding requirements for charge neutralization of the FPD industry. These deficiencies may include:

The high cost of operating and maintaining traditional ionization cells, including the cost of high clean dry air (CDA) or nitrogen gas consumption during operation;

Insufficient cleanliness of the ionized gas stream because the higher quality of high resolution flat panel displays requires low or no particle emission (at least no particles larger than 0.1 micron) from the ion emitter(s); and Unacceptably long discharge times for electrostatic charges because display panel throughput rates demand higher charge neutralization efficiency than has been heretofore available.

Charge neutralizing bars with linear ionizers (ionizing cells comprising long thin wire(s) as emitter(s)/electrode(s)) have been suggested in (1) U.S. Pat. No. 7,339,778, entitled "Corona Discharge Neutralizing Apparatus"; (2) U.S. Pat. No. 8,048,200, entitled "Clean Corona Gas Ionization For Static Charge Neutralization"; and (3) U.S. Patent Application Publication US 2007/0138149. U.S. Pat. No. 7,339,778, entitled Corona Discharge Static Neutralizing Apparatus, and issued on Mar. 4, 2008 is hereby incorporated by reference in its entirety. U.S. Pat. No. 8,048,200, entitled Clean Corona Gas Ionization For Static Charge Neutralization, and issued on Nov. 1, 2011 is also hereby incorporated by reference in its entirety. Further ionizing bars with wire emitters are currently produced by AB Liros Electronic of Malmö, Sweden and/or Liros Electronic of Hamburg, Germany using the following product names: standard series ionizers and/or SER series ionizing tubes.

Common problems encountered by the use of stretched wire emitter ionizers (linear ionizers) have been solved with the various innovations presented in U.S. patent application Ser. No. 13/438,538 filed Apr. 3, 2012 and entitled "MULTI-SECTIONAL LINEAR IONIZING BAR AND IONIZATION CELL" (now U.S. Pat. No. 8,492,733). However, additional refinements that further improve functionality are still possible and desirable.

SUMMARY OF THE INVENTION

The currently disclosed invention suggests new approaches for linear ionizing bar design that are capable of solving the above-mentioned and other problems. In one form, the present invention satisfies the above-stated needs and overcomes the above-stated and other deficiencies of the related art by providing a linear ionizing bar with configurable nozzles for urging charged carriers toward a charged target in a reconfigurable pattern. The bar may have a linear ion emitter, for establishing an ion cloud of charge carriers in response to the provision of an ionizing voltage, a reference electrode that presents a non-ionizing electric field in response to the provision of a non-ionizing voltage, and a manifold for receiving gas from a source and for directing the gas past the linear ion emitter. The manifold may have plural manifold apertures and nozzled inserts may be received within the apertures, at least some of the inserts having at least one nozzle aperture through which the gas may flow and the plurality of inserts being collectively configured to direct ions away from the linear ion emitter and toward the charge neutralization target in a reconfigurable ionized gas flow pattern.

The nozzle inserts may variously each define none, one central, one eccentric, and/or plural eccentric nozzle aperture(s) through which the gas may flow. The inserts may be removed and replaced to reconfigure the gas flow pattern or, alternatively, the eccentric inserts may be rotated in the manifold aperture within which it is received to thereby change the position of the nozzle aperture(s) relative to the linear ion emitter. Although the nozzle inserts are preferably not permanently affixed in place, they are preferably made of a deformable material that may be urged (in sealing fashion) into the manifold aperture into which they are received by the gas pressure within the manifold. In a particularly preferred form, gas inserts may each define at least one gas nozzle aperture that tapers inwardly from an entry end to an opposing exit end. Optionally, some inserts may also be rotated in the manifold aperture within which they are received between a finite number of discrete and angularly offset positions to thereby change the position of the aperture/orifice relative to the linear ion emitter. At least some of the nozzle inserts of the ionizing bar may be selectively removed from and selectively reinserted into some of the apertures to thereby collectively change the pattern of gas directed away from the manifold and toward the charged target. Optionally, inserts may each have at least one aperture that is angled relative to the axis of the manifold aperture within which it is received.

Some methods in accordance with the invention may contemplate changing the pattern of gas flow exiting a manifold of the type described above by rotating at least one of the nozzle inserts without removing the insert from the aperture within which it is received. Rotating the insert(s) in this way changes the position of the insert nozzle(s) relative to the linear ion emitter.

Other methods in accordance with the invention may contemplate changing the pattern of gas flow exiting a manifold of the type described above by removing at least one of the nozzle inserts from the aperture within which it is received and placing another insert into the aperture from which the at least one insert was removed. Insert-substitution is, therefore, and alternative way to change the pattern of gas directed away from the manifold and toward the target.

Naturally, the above-described methods of the invention are particularly well adapted for use with the above-described apparatus of the invention. Similarly, the apparatus embodiments of the invention are well suited to perform the inventive methods described above. All of these embodiments offer an optimal combination of efficiency, flexibility and economy not heretofore available in the linear ionizer corona discharge art.

Numerous other advantages and features of the present invention will become apparent to those of ordinary skill in the art from the following detailed description of the preferred embodiments, from the claims and from the accompanying drawings.

BRIEF DESCRIPTION OF THE DRAWINGS

The preferred embodiments of the present invention will be described below with reference to the accompanying drawings wherein like numerals represent like steps and/or structures and wherein:

FIGS. 3F and 3G show another alternative nozzled insert design in accordance with the present invention;

FIG. 6A is a perspective view of the eccentric nozzle insert of FIG. 6;

FIG. 7A is a perspective view of the eccentric dual-nozzle insert of FIG. 7;

FIG. 7B is a perspective view of a non-circular eccentric dual-nozzle insert;

DETAILED DESCRIPTION OF THE PREFERRED EMBODIMENTS

Figure 1:
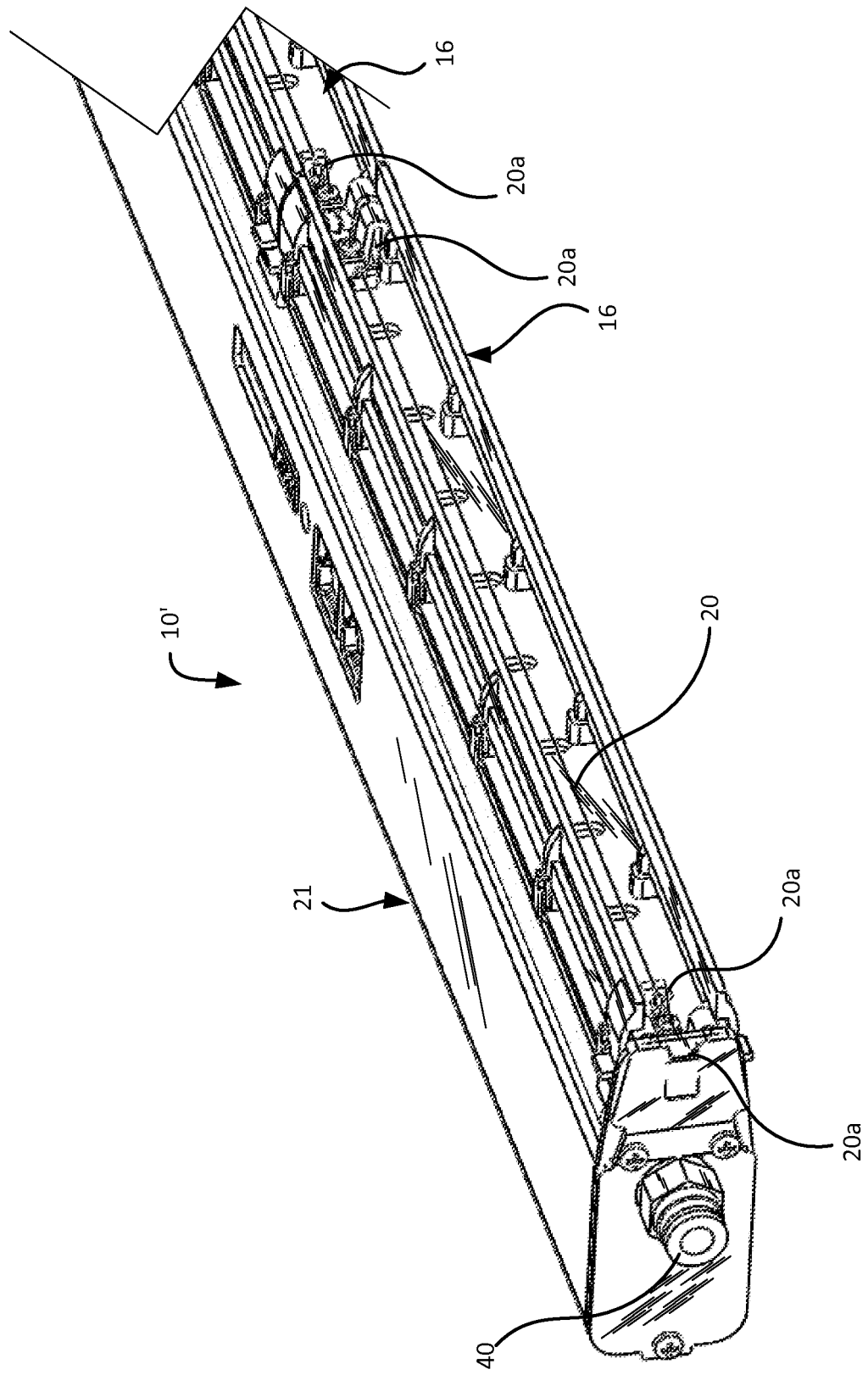
FIG. 1 shows a partial inventive linear ionizing bar in accordance with one embodiment of the invention.
Figure 2:
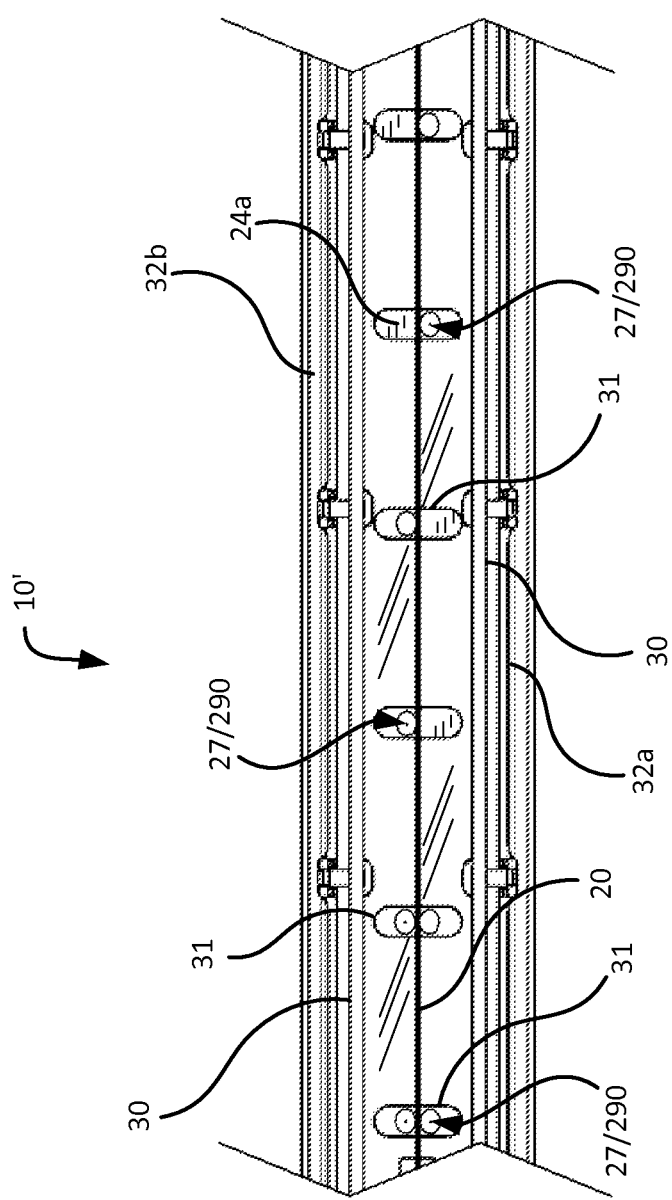
FIG. 2 is a partial bottom plan view of the ionizing bar of FIG. 1.

With primary reference to FIGS. 1 and 2, the inventive ionizing bar 10' preferably comprises at least three primary elements: at least one ionization cell 16 with at least one axis-defining linear ion emitter 20 for establishing an ion plasma region (or ion cloud) 22 along the length thereof, a manifold 24 for receiving gas from a source and for delivering same past linear ion emitter(s) 20 in a (re)configurable and predetermined pattern, and means 20a for receiving ionizing voltage(s) from a suitable power supply, with an optional control system (not shown) and delivering same to linear ion emitter(s) 20 to thereby establish ion plasma region 22 having an outer peripheral boundary. In multi-cell embodiments, each ionization cell 16 of a bar 10 may comprises at least one linear, for example, wire type corona discharge ion emitter/electrode 20, at least one non-ionizing reference electrode 32a and 32b and an array (multiplicity/plurality) of manifold apertures 27 extending through manifold plate 24a and positioned between the electrodes 32a and 32b as shown. Apertures 27 are preferably aligned with larger openings 31 that extend though a bottom plate of each ionization cell 16 but that are large enough to have little or no impact/influence on gas flow through the cell (especially gas flow leaving apertures 27). Each of manifold apertures 27 may be circular and, if so, may have an aperture diameter ranging between about 1/32" to about 5/32" and may be capable of receiving inserts 290, 292, and/or 294. An aperture diameter of about 0.058" to about 0.059" is most preferred.

Figure 3B:
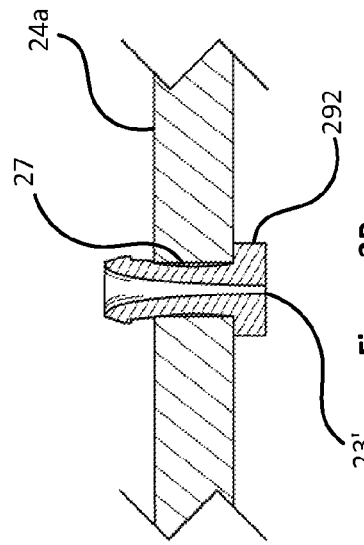
FIG. 3B shows an alternative nozzle insert design in accordance with the present invention.
Figure 3C:
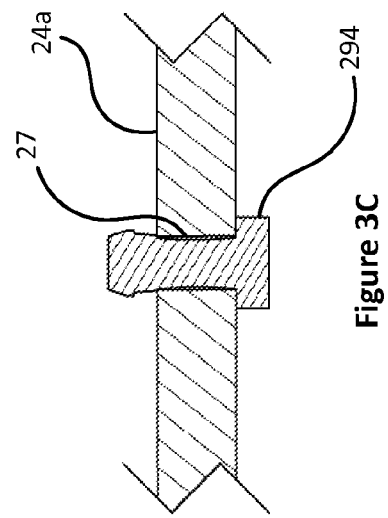
FIG. 3C shows a solid insert/plug design (with no nozzle, orifice and/or gas channel) in accordance with the present invention.
Figure 3A:
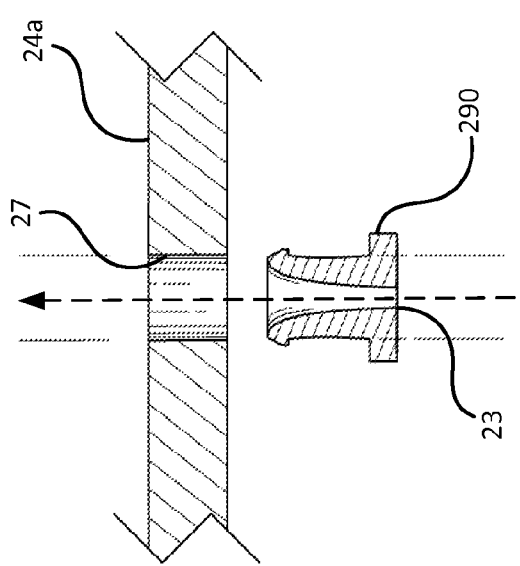
FIG. 3A illustrates nozzle insert installation and removal in accordance with the invention.
Figure 3A:
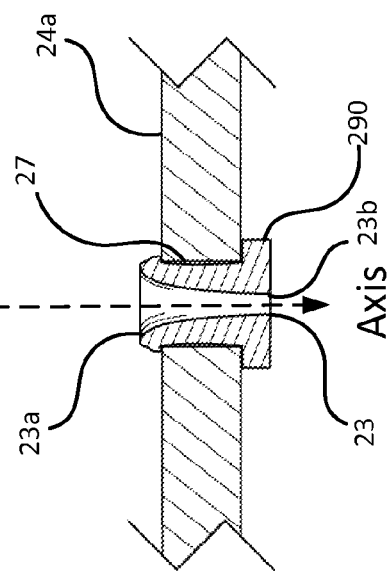

Turning primary focus now to FIGS. 3A through 3C, inserts 290 and/or 294 are preferably nozzled with (preferably tapered) nozzle apertures 23 extending therethrough and each nozzled insert may create a high speed of air/gas jet 28 and to thereby entrain ambient air A in accordance with the "Coanda" effect. Each nozzle aperture may have a wider entry end 23a (with a diameter between about 0.03 inches and about 0.5 inches) and an opposing exit end 23b with a diameter between about 0.0098 inches and about 0.016 inches (with about 0.0135 inches being most preferred). Manifold apertures 27 may be formed by cutting with laser, sand blasting, molding into the manifold plate 24a, and/or cutting with a water jet. However, they may also be formed by conventional drilling techniques. Because of the relatively large size of these apertures, difficulties associated with drilling very small holes (e.g., burr and shavings removal) and are not encountered.

By contrast, nozzle apertures 23 of inserts 290 and/or 292 are not drilled but may be formed by cutting with laser, sand blasting, cutting with a water jet, and/or conventional molding techniques. Inserts 290, 292, and/or 294 can be molded from various plastic materials having a lower density and being significantly softer than the materials (e.g., ABS plastics) from which manifold plate 24a is formed. For example, all inserts discussed herein may be integrally formed of "LDPE" (low density polyethylene) with lower Joung's modulus or Modulus of Elasticity, (in the range of between about 0.01 GPa and about 0.5 GPa, which is significantly lower than a typical modulus of ABS plastic (about 1.4 GPa to about 3.1 GPa)). The insert nozzles preferably have an outside diameter of about 0.06" so that they snugly fit into the slightly smaller manifold apertures 27. While this will cause some nozzle deformation (e.g., pinching/constriction), the fact that the exit end of nozzle aperture 23 is not subject to such forces means that the exit end remains virtually undeformed at the desired dimension. Further, tapering the nozzle apertures from an entry end (open to the interior of the manifold) also helps insure that any minor nozzle deformation will have no appreciable effect on gas disbursement. As best seen in FIG. 3B, inserts 292 and 294 include the optional feature of being somewhat elongated and including plural "steps" so that they may snuggly engage manifolds 24a of various thicknesses. Nozzle apertures of the type discussed throughout may have side walls that are curved, linear and angled, or linear and parallel when viewed in cross section. In use, the axis of manifold aperture 27 is preferably coincident with the axis of nozzle aperture 23.

Turning primary focus now to FIGS. 3D through 3K, inserts 293, 293', 293", and 295 are preferably nozzled with (preferably tapered) apertures 23' extending therethrough. As with the inserts described above, each of these nozzled inserts may create a high speed of air/gas jet to thereby entrain ambient air A in accordance with the "Coanda" effect. Each nozzle aperture 23' may have a wider entry end 23a' (with a diameter between about 0.03 inches and about 0.5 inches) and an opposing exit end 23b' with a diameter between about 0.0098 inches and about 0.016 inches (with about 0.0135 inches being most preferred). Inserts 293, 293', 293", and 295 are preferably received within manifold apertures 27 and nozzle apertures 23' may be formed by cutting with laser, sand blasting, cutting with a water jet, and/or conventional molding techniques. Inserts 293, 293', 293", and 295 can be molded from various plastic materials having a lower density and being significantly softer than the materials (e.g., ABS plastics) from which manifold plate 24a is formed. For example, inserts discussed herein may be integrally formed of "LDPE" (low density polyethylene) with lower Joung's modulus or Modulus of Elasticity, (in the range of between about 0.01 GPa and about 0.5 GPa, which is significantly lower than a typical modulus of ABS plastic (about 1.4 GPa to about 3.1 GPa)). The insert nozzles preferably have an outside diameter of about 0.063" so that they snugly fit into the slightly smaller manifold apertures 27. While this will cause some nozzle deformation (e.g., pinching/constriction), the fact that the exit end of nozzle aperture 23' is not subject to such forces means that the exit end remains virtually undeformed at the desired dimension. Further, tapering the nozzle apertures from an entry end (open to the interior of the manifold) also helps insure that any minor nozzle deformation will have no appreciable effect on gas disbursement. Nozzle apertures of the type discussed throughout may have side walls that are curved, linear and angled, or linear and parallel when viewed in cross section.

Figure 3E:
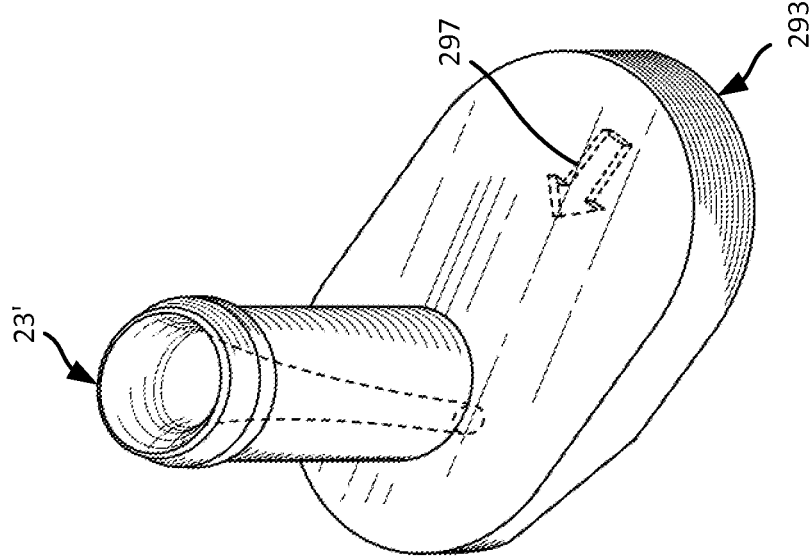
FIGS. 3D and 3E show another alternative nozzled insert design in accordance with the present invention.
Figure 3D:
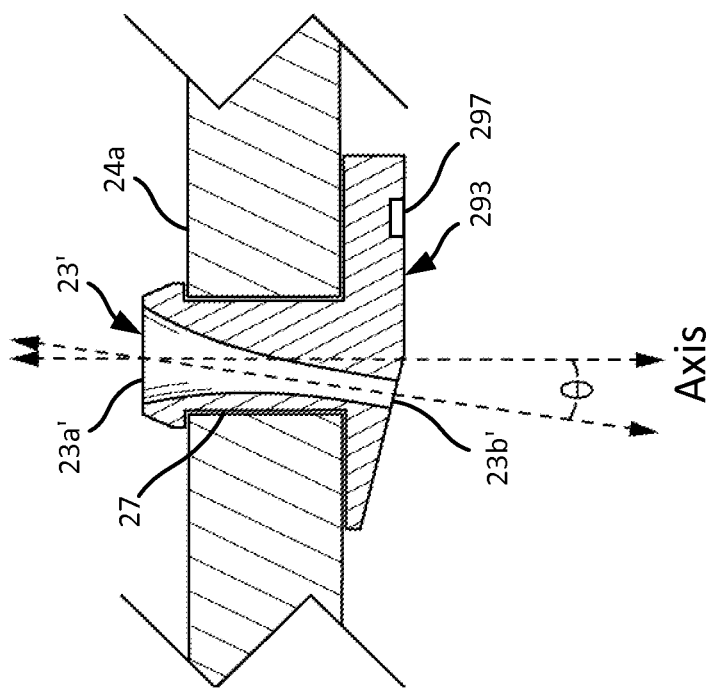
Figure 3I:
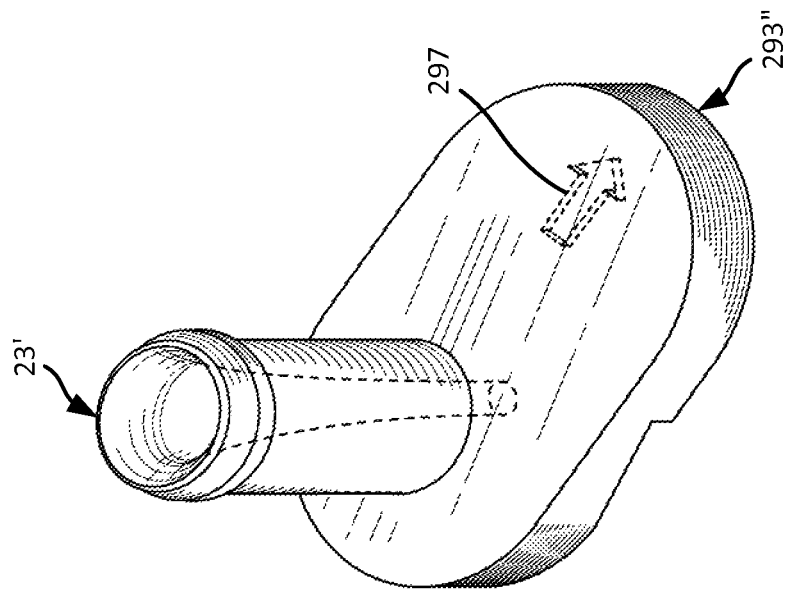
FIGS. 3H and 3I show another alternative nozzled insert design in accordance with the present invention.
Figure 3H:
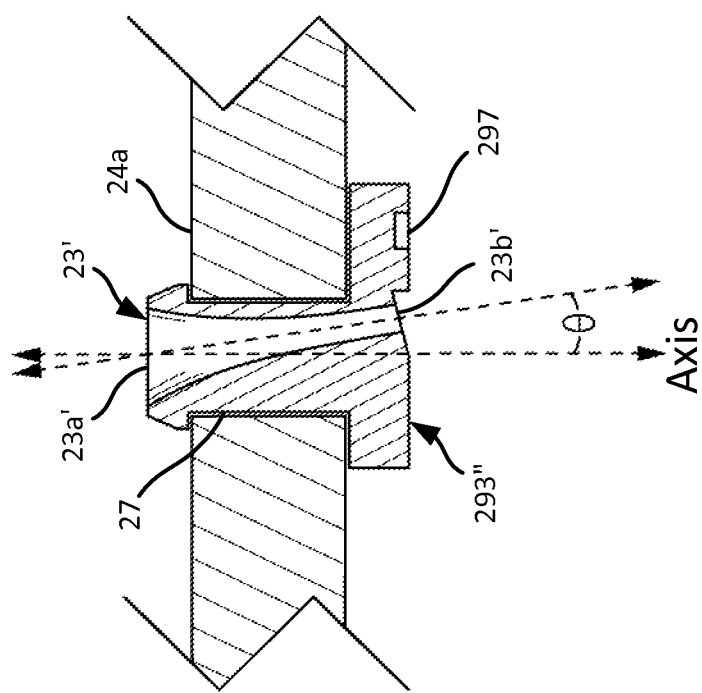
Figure 3K:
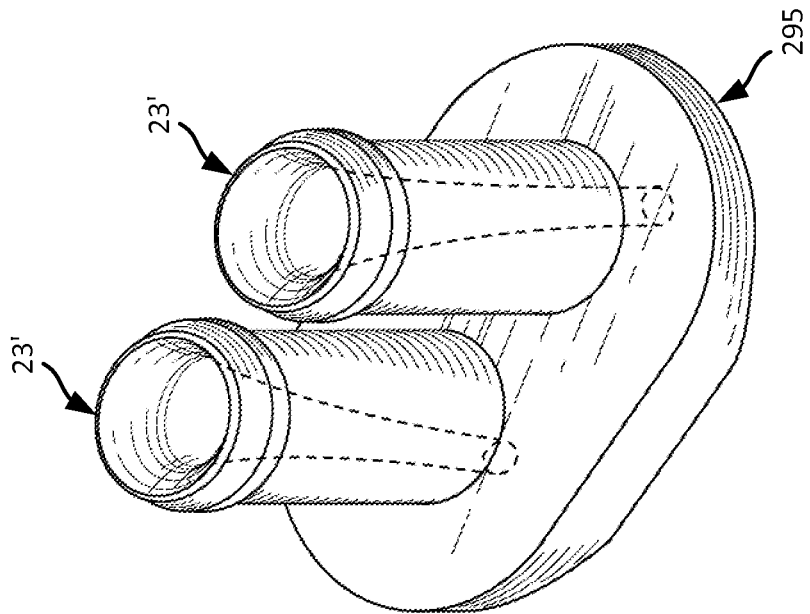
FIGS. 3J and 3K show another alternative nozzled insert design in accordance with the present invention.
Figure 3J:
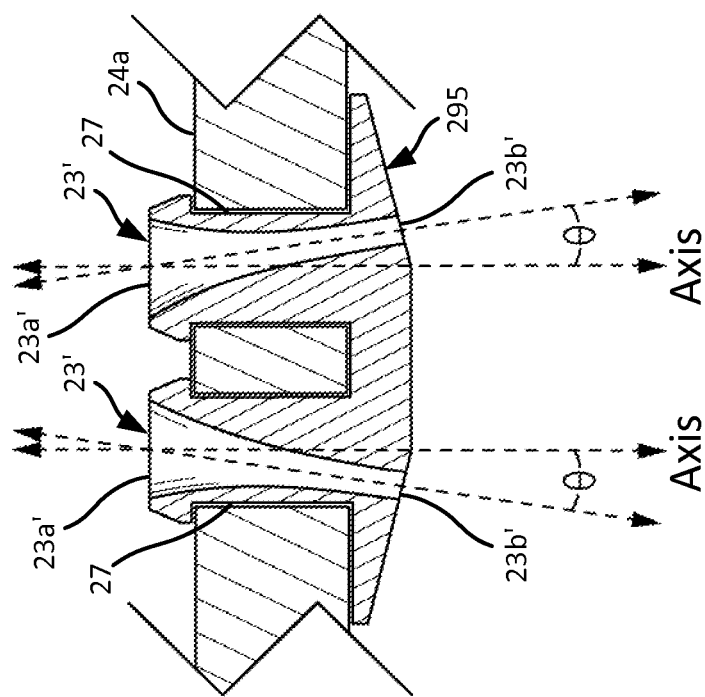

Turning now to FIGS. 3D and 3E insert 293 is shown in cross section and in perspective views, respectively. Insert 293 operates in generally the same way as the inserts 290 and 292 described above except that insert 293 preferably has (1) a nozzle aperture 23' that is angled Θ relative to the manifold aperture Axis; (2) a flat surface that surrounds and is perpendicular to exit end 23b' of the aperture; and (3) a visual indicator 297 showing the direction of the nozzle aperture Θ relative to the manifold aperture Axis. The nozzle aperture angle Θ is preferably between about 5 degrees and 20 degrees relative to the manifold aperture Axis and is most preferably about 10 degrees. Insert 293 may be used in a number of ways, including to as a substitute for one of inserts 290 or 292 to provide a wider spray pattern of gas from the manifold plate 24a; this, in turn, may enable ionization of a target object that is unusually close and/or wide. Indicator 297 is preferably a molded arrow that shows the direction of the nozzle aperture angle to simplify installation by unskilled/semi-skilled workers. Insert 293 is shown in a typical operation in FIG. 4D.

With reference to FIGS. 3F and 3G, those of ordinary skill will readily appreciate that insert 293' is structurally and operationally substantially similar to 293. Insert 293', however, presents an opposite angle Θ and may be used in a number of ways including to provide a narrower spray pattern of gas from the manifold; this, in turn, may enable more intense ionization of a limited portion of a target object. Insert 293' is shown in a typical operation in FIG. 4E.

With reference to FIGS. 3H and 3I, those of ordinary skill will readily appreciate that insert 293" is structurally and operationally substantially similar to insert 293'.

With reference to FIGS. 3J and 3K, those of ordinary skill will readily appreciate that insert 295 is structurally and operationally substantially similar to a pair inserts with outwardly oriented and angled nozzle apertures of the type described above. Insert 295, however, is preferably integrally formed and may have a generally oval-shaped body. Insert 295 is shown in a typical operation in FIG. 4F.

Turning primarily again to FIGS. 1 and 2 it is shown that, with the flexibility afforded by the invention, apertures 27 of ionizer 10' may be located in various ways throughout the length of manifold plate 24*a* and the inserts may be arranged therein as desired as a matter of design choice by those of ordinary skill. For example, apertures 27 may be uniformly spaced from one another by a distance ranging between about 15 millimeters and about 75 millimeters (with about 50 millimeters being most preferred) as measured at least substantially parallel to linear ionizer 20 or the axis defined thereby (into the plane of the page as shown in FIGS. 4A through 4F, 8 through 9, and 9A). Also, as shown in this exemplary configuration, every other manifold aperture may, optionally, be plugged on laterally opposite side of linear ionizer 20 by an insert/plug 294 with no aperture(s) passing therethrough. FIG. 2 illustrates an ionizer embodiment designed to provide a charge neutralization boost at the very ends of the ionizing bar. So in this case a pair of nozzled inserts are used close to the left-hand end of the bar 10'.

FIGS. 4A through 4F conceptually illustrate representative relationships between air/gas streams 28/28' and ionic plasma regions in cross-sectional view of ionizer bar 10'. In particular, FIG. 4A schematically illustrates predetermined air/gas flow patterns 28 from two advantageously positioned inserts 290 and the position of ion cloud 22 within a bar 10'. As shown, one of nozzle inserts 290 directs clean gas toward a charge neutralization target object TO outside of plasma region 22 and the other nozzle insert 290 directs clean gas toward charge neutralization target object TO through plasma region 22. In particular, FIG. 4A illustrates a pattern of inserts targeted to improve charge neutralization by the placement inserts in two positions: one blowing gas (CDA) in a space close to ion cloud created by wire emitter electrode and a second one in a space outside of the ion cloud and close to the right and/or or left grills. The diameter and the height of the insert nozzles may be different among the various nozzle inserts. Inserts spaced away from the emitter 20 may provide additional gas flow (from manifold (CDA) as well by entraining ambient air A) to help harvest and deliver ions to the target area/object. FIG. 4B schematically illustrates another potentially desirable predetermined air/gas flow pattern using an ionizing bar 10'. In this configuration both of inserts 290 direct clean gas outside of plasma region 22 and toward charge neutralization target object TO. FIG. 4C schematically illustrates the substitution of a non-nozzled insert/plug 294 for one of the nozzle inserts 290 shown in FIG. 4B, the ionizing bars being otherwise identical. Since the various inserts in accordance with the invention are relatively soft/pliable, conversion from the bar of FIG. 4B to the bar of FIG. 4C consists essentially of removing one of inserts 290 from one manifold apertures 27 and inserting insert/plug 294 into the (now vacant) manifold aperture 27 to thereby change the insert pattern of the manifold.

Figure 4C:
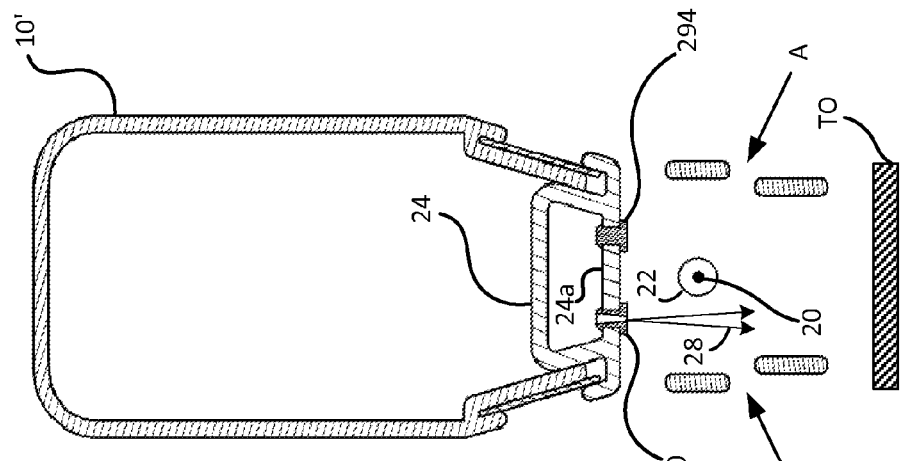
FIGS. 4A-4C show representative cross-sectional views of a preferred ionizing bar configured into three alternative gas delivery patterns.
Figure 4B:
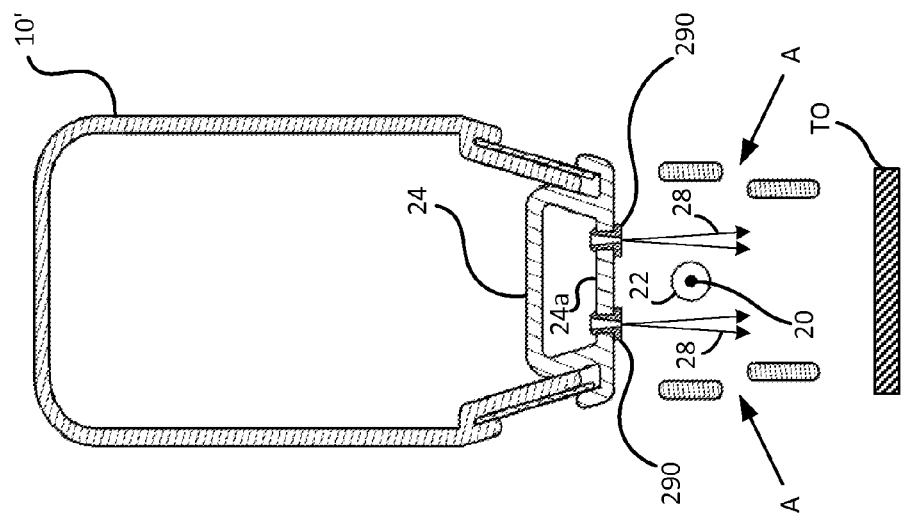
Figure 4A:
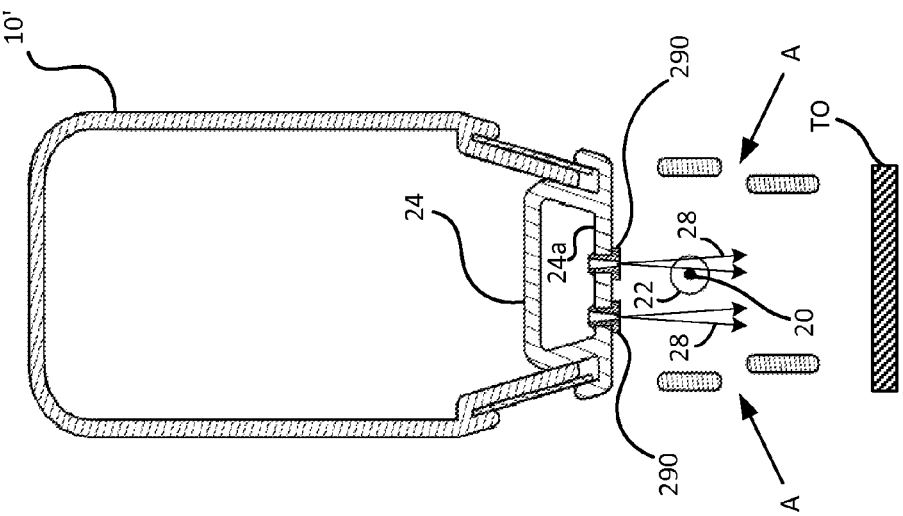
Figure 4F:
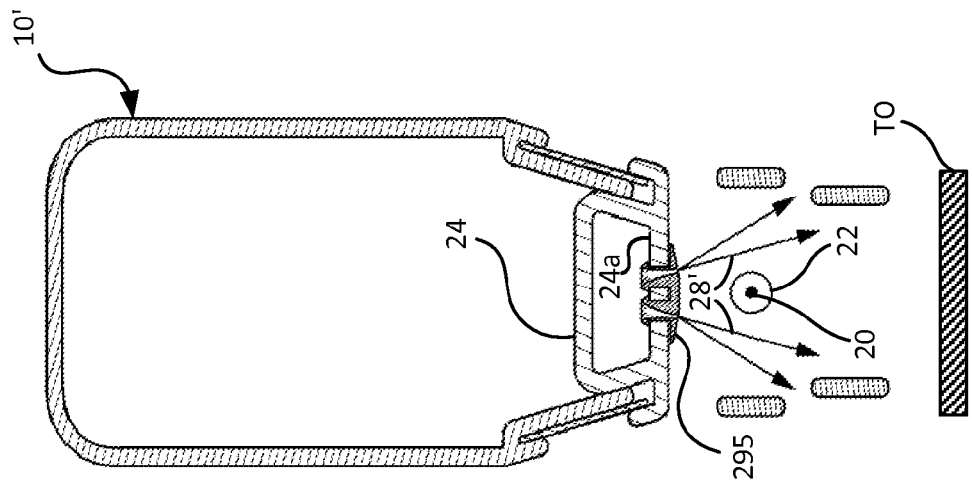
FIGS. 4D-4F show representative cross-sectional views of a preferred ionizing bar configured into three additional alternative gas delivery patterns.
Figure 4E:
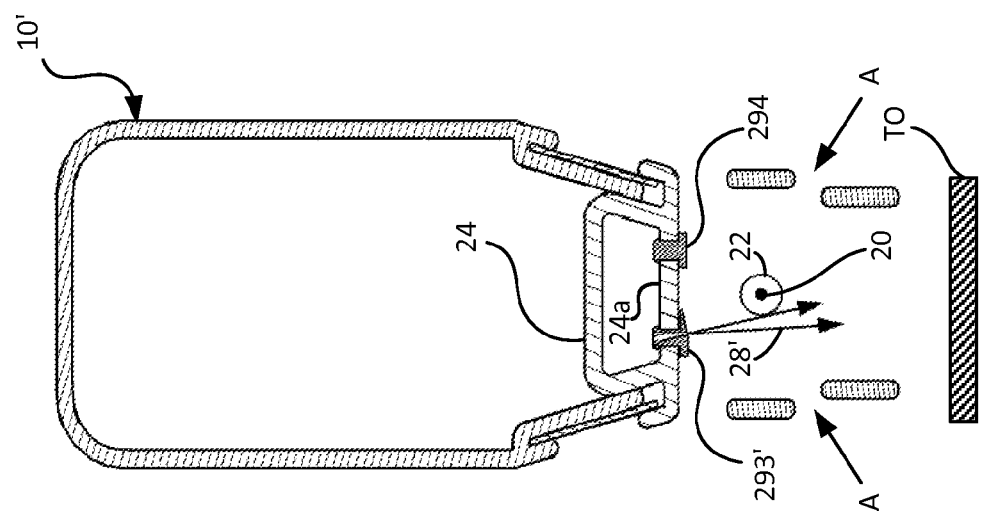
Figure 4D:
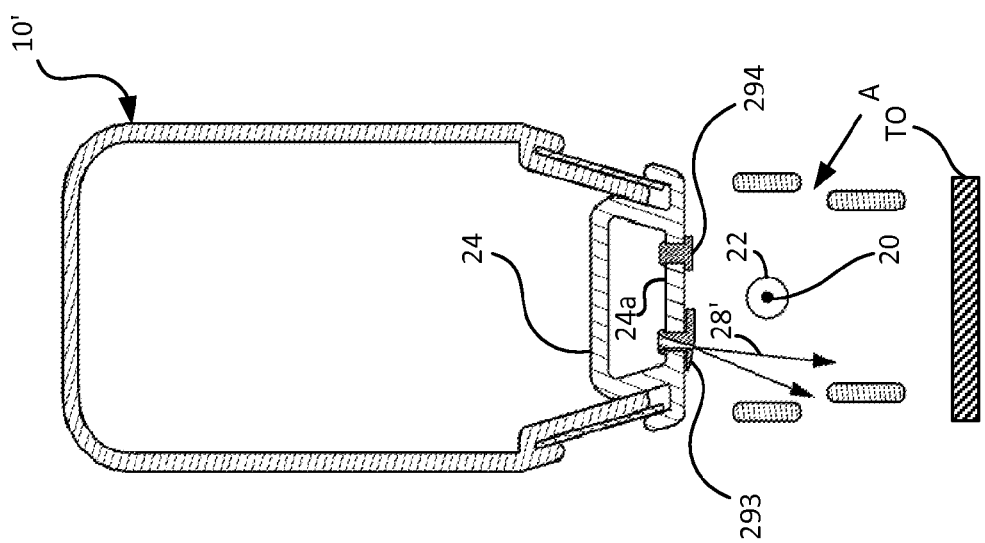

FIGS. 4D and 4E schematically illustrate predetermined air/gas flow patterns 28' that are generally similar to that of FIG. 4C since each Figure includes a nozzle-less insert 294. As shown in FIG. 4D, nozzled insert 293 directs clean gas toward a charge neutralization target object TO but angled away from plasma region 22 by an amount Θ that is preferably between 5 degrees and 20 degrees from the manifold aperture axis. In particular, FIG. 4D illustrates a pattern of inserts targeted to improve charge neutralization on the left-hand side of the target object TO due to the angled nozzle aperture of the insert. To enhance this effect the right and/or or left grills may be rearranged in a conventional manner and entrainment of ambient air A may be different as a result. FIG. 4E schematically illustrates another potentially desirable predetermined air/gas flow pattern using an ionizing bar 10'. In this configuration insert 293' directs clean gas toward plasma region 22 and toward the right-hand side of target object TO by an angle Θ due to the angled nozzle aperture of the insert. Naturally, additional gas flow (CDA) (from the manifold) (as well by entraining ambient air) to help harvest and deliver ions to the target area/object may be provided if plug 294 is replaced with a single-nozzle insert (whether or not angled) and such a configuration, is within the skill of the ordinary artisan in light of the invention disclosure contained herein. FIG. 4F schematically illustrates the use of a double-angled nozzle insert 295 to provide a wide CDA spray pattern for ion delivery to target object TO. Spray patterns of this nature are particularly useful delivering ions to a target object TO that is unusually close and/or wide. Again, further variations may be achieved by altering/removing some or all of the ionizing bar grills and this is within the skill of the ordinary artisan.

Figure 5:
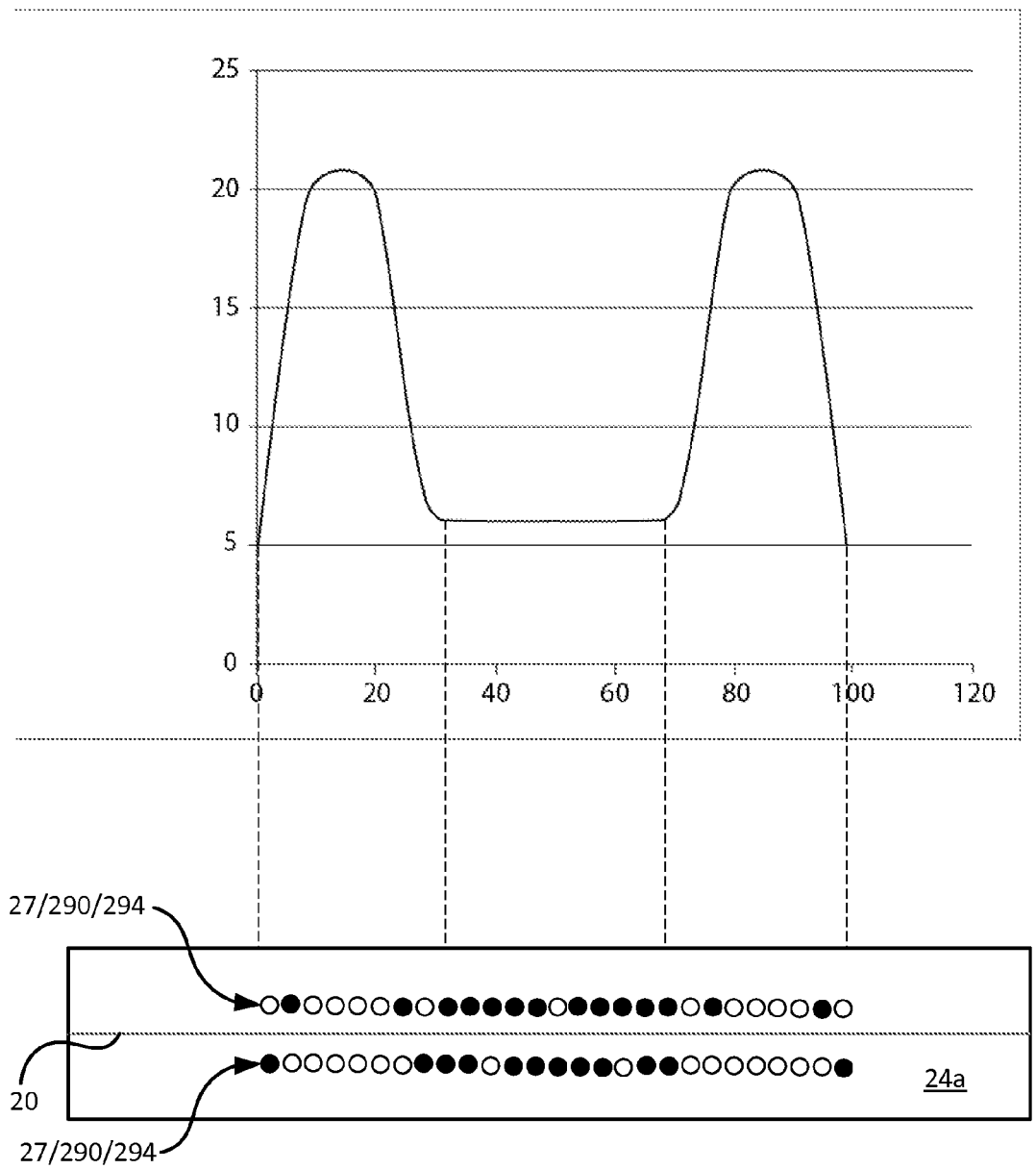
FIG. 5 represents distributed charge density on a target object to be neutralized in conjunction with an ionizing bar gas delivery pattern tailored for efficient neutralization of this target object.
Figure 6:
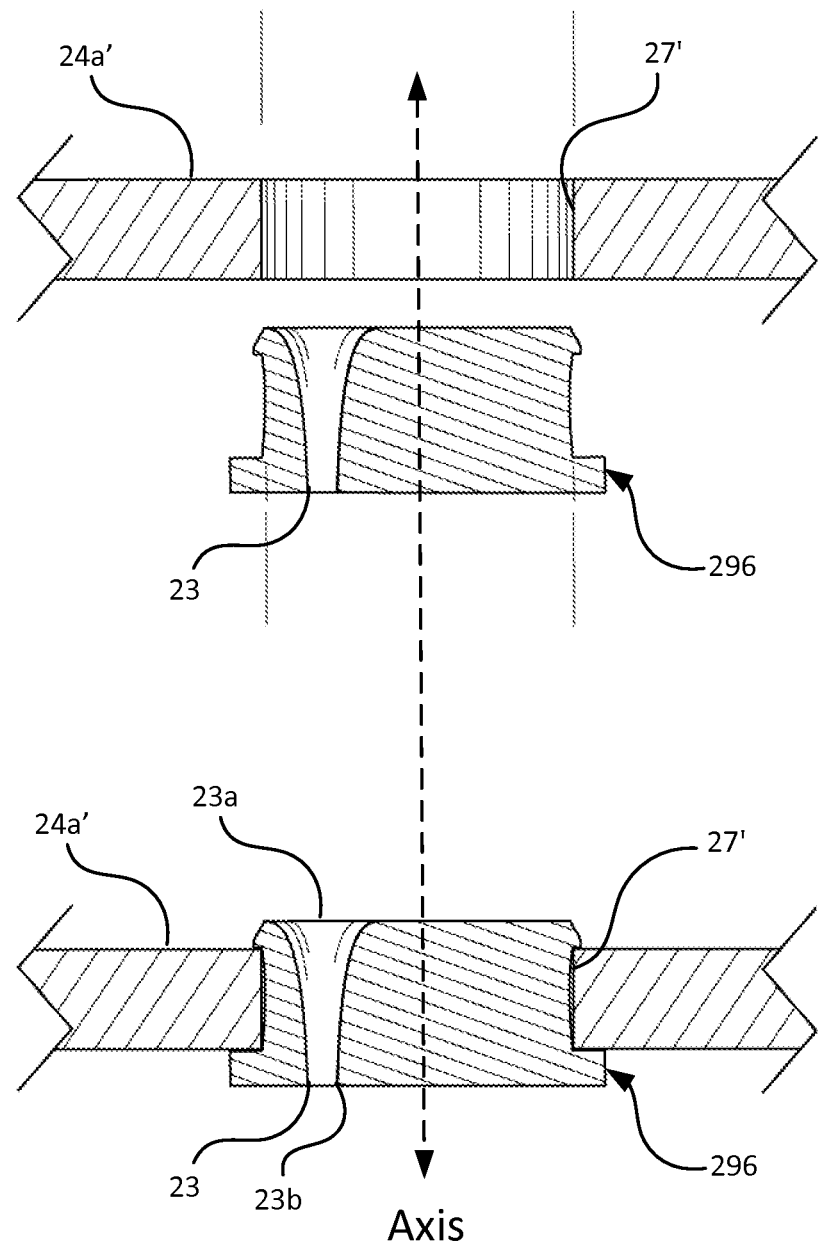
FIG. 6 illustrates installation and removal of an eccentric single-nozzle insert in accordance with the invention.
Figure 7:
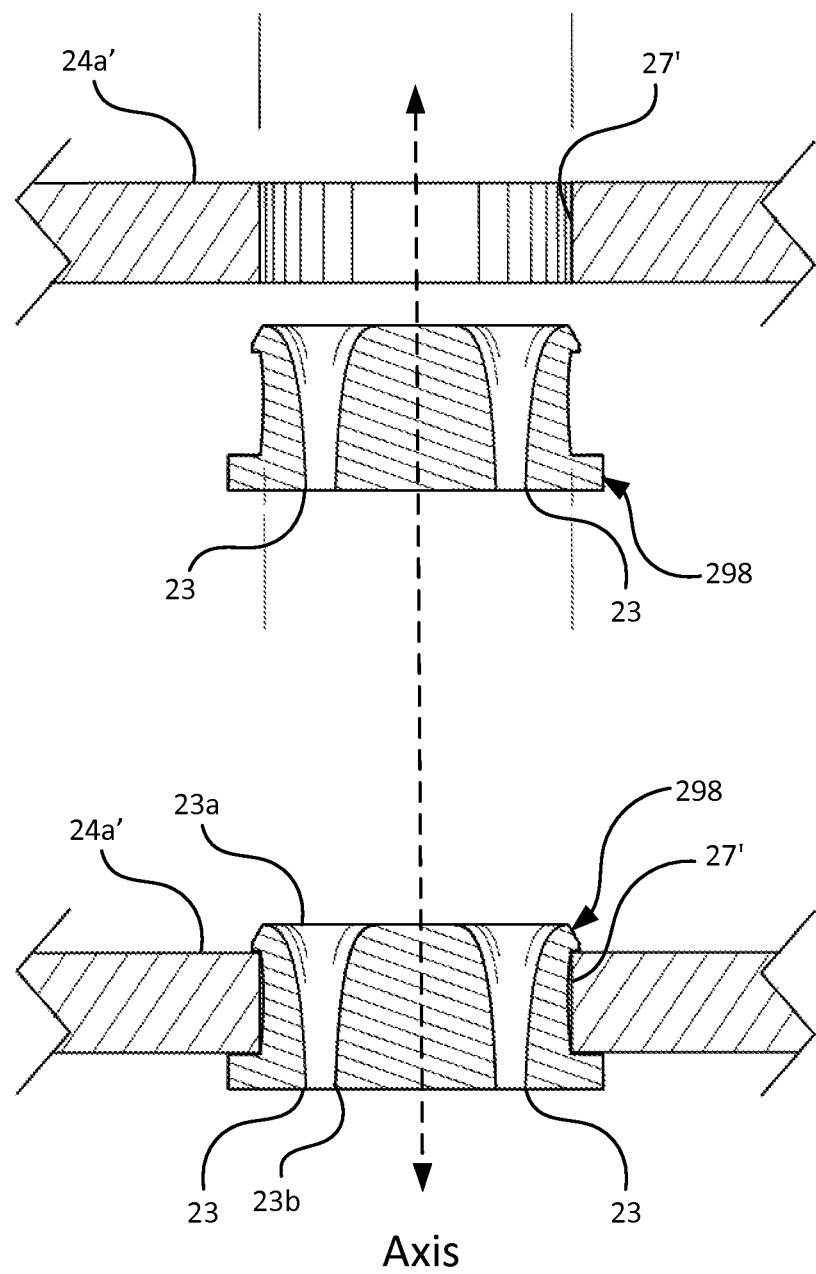
FIG. 7 illustrates installation and removal of an eccentric dual-nozzle insert in accordance with the invention.

Turning to FIG. 5, there is shown therein a chart showing charge density on a charge neutralization target object to be neutralized by the delivery of ions in accordance with the invention. Such conditions commonly occur in plastic film or sheet of glass, which may have maximum charge density in areas close to the edges and minimum charge in the middle. Also, shown in FIG. 5 is a schematic bottom view of an inventive ionizer configured for maximally effective neutralization of the charged target object. In particular, this pattern of nozzle inserts 290 and non-nozzle inserts (plugs in black) 294 is designed to supply ions where a charged target object requires them most. Naturally, inserts 290 and 294 may be removed and rearranged in any of the apertures 27 to provide optimal results in a very wide range of applications. Further, other spray appaterns may be achieved using angled-nozzle-aperture inserts 293, 293', and/or 293" as desired.

As shown, the alternative preferred apparatus embodiments of FIGS. 6 through 9A employ enlarged nozzle inserts 296, 298 with eccentric nozzles 23 (relative to a central Axis) and positioned within enlarged apertures 27' of a manifold plate 24a' of ionizer 10". As with the apparatus previously discussed, each of manifold apertures 27' may be circular and, if so, may have an aperture diameter ranging between about 0.13 "to about 0.38" and may be capable of receiving inserts 296, 298. A circular aperture diameter of about 0.13" to about 0.2" is most preferred. Inserts 296, 298 preferably include nozzle apertures with tapered nozzles 23 extending therethrough. In the variant 298' of FIG. 7B, the insert 298' and the manifold aperture 27' may be non-circular in cross-section and, therefore, resist rotation. Each nozzle aperture may have a wider entry end 23a and an opposing exit end 23b. Manifold apertures 27' may be formed by cutting with laser, sand blasting, molding into the manifold plate 24a', and/or cutting with a water jet. However, they may also be formed by conventional drilling techniques. Because of the relatively large size of these apertures, difficulties associated with drilling very small holes (e.g., burr and shavings removal) and are not encountered.

By contrast, nozzle apertures 23 of inserts 296, 298, and/or 298' are not drilled but may be formed by cutting with laser, sand blasting, cutting with a water jet, and/or conventional molding techniques. Inserts 296, 298, and/or 298' can be molded from various plastic materials having a lower density and being significantly softer than the materials (e.g., ABS plastics) from which manifold plate 24a' is formed. For example, all inserts discussed herein may be formed of "LDPE" (low density polyethylene) with lower Joung's modulus or Modulus of Elasticity, (in the range of between about 0.01 GPa and about 0.5 GPa, which is significantly lower than a typical modulus of ABS plastic (about 1.4 GPa to about 3.1 GPa)) The circular inserts 296 and/or 298 preferably have an outside diameter of about 0.13" to about 0.25" so that they snugly fit into the slightly smaller manifold apertures 27'. While this will cause some nozzle deformation (e.g., pinching/constriction), the fact that the exit end 23b of nozzle aperture 23 is not subject to such forces means that the exit end remains virtually undeformed at the desired dimension. Although not shown, nozzle apertures 23 may be angled Θ relative to manifold apertures 27' as desired.

Figure 9A:
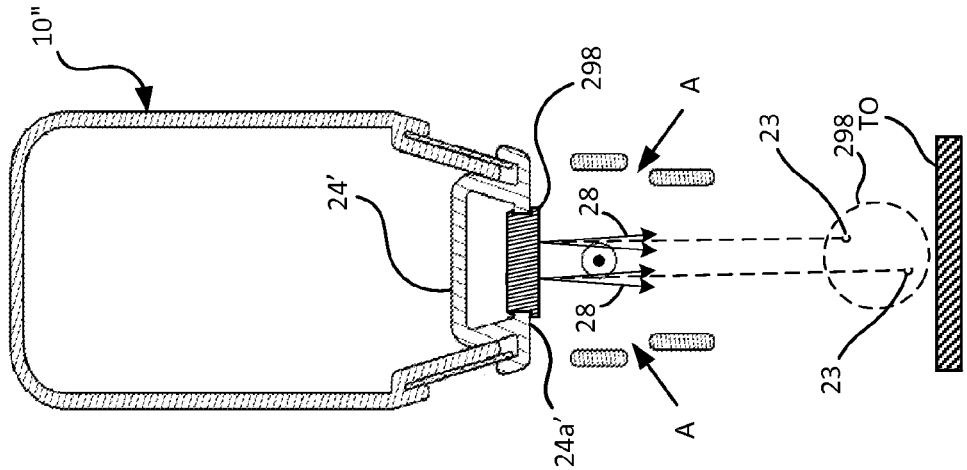
FIGS. 8, 9, and 9A show cross-sectional views of an alternative preferred ionizing bar configured into three representative gas delivery patterns.
Figure 9:
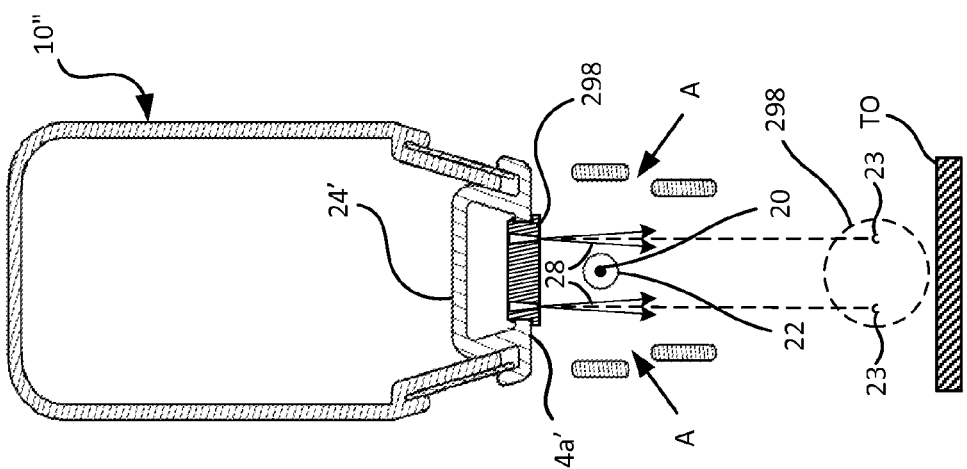
Figure 8:
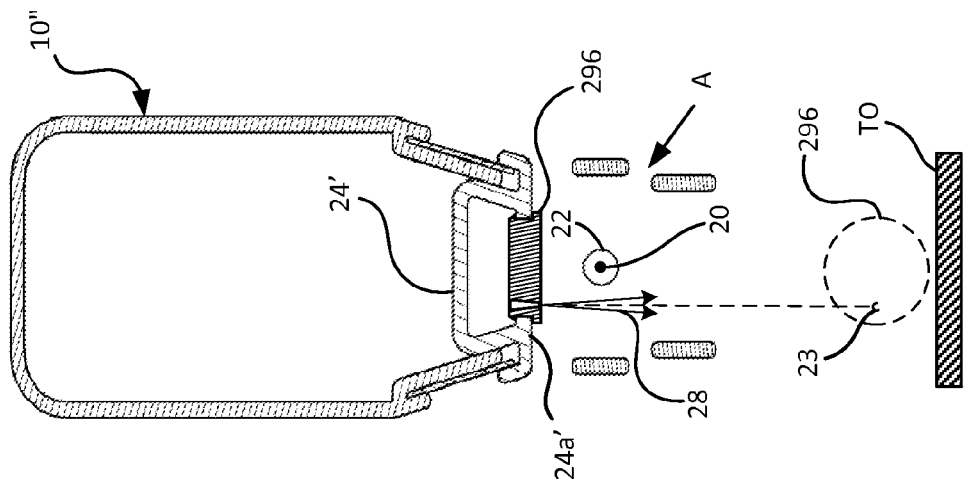

Apertures 27' of ionizer 10" may be located through manifold plate 24a' as desired and inserts 296, 298, 298' and/or non-apertured inserts (plugs) may be placed therein as a matter of design choice by those of ordinary skill. FIGS. 8 through 9A conceptually illustrate representative relationships between air/gas streams 28 and ionic plasma regions 22 in cross-sectional view of ionizer bar 10". Throughout these Figures, top plan view dotted line images of inserts 296 and 298 have been shown to illustrate operation of the inserts to achieve different spray patterns 28. Those of ordinary skill will readily appreciate that the inserts shown in dotted lines are not physically present. For example, single-nozzle insert 296 is shown in FIG. 8 as having been selectively rotated into a position in which nozzle 23 is maximally spaced to the left of linear emitter 20. Since insert 296 is not fixedly attached within aperture 27', it may be selectively rotated any amount to change the distance of spray/jet 28 to emitter 20 as well as the right/left hand orientation of same. In certain preferred embodiments, inserts 296, 298 may be rotated within manifold aperture 27' between a finite number of discrete and angularly offset positions to thereby change the position of the nozzle relative to the linear ion emitter. In the particular configuration shown in FIG. 8 a reconfigurable air/gas flow pattern 28 from insert 296 passes ion cloud 22 within ionizing bar 10". As shown, nozzle 23 of insert 296 directs ionized gas toward a target object TO outside of plasma region 22.

Turning now to FIGS. 9 and 9A, there is shown an ionizing bar 10" in two representative configurations in which insert 298 is shown in two different orientations. Note that FIG. 9 includes a top plan view dotted line image of insert 298 with nozzles 23 aligned 90 degrees relative to linear emitter 20. Thus, dual-nozzle insert 298 is shown as having been selectively rotated into a position in which nozzles 23 are maximally spaced to the left and to the right of linear emitter 20. By contrast, FIG. 9A includes a top plan view dotted line image of insert 298 with nozzles 23 aligned about 30 degrees relative to linear emitter 20. Note that rotation of insert 298 moves nozzles 23 away from the cross-sectional plane and therefore they are no longer visible in FIG. 9A. Also note that, in the preferred embodiments of FIGS. 8 through 9A, a plurality of apertures 27' and individually rotatable inserts 296, 298 (collectively) extend parallel to emitter 20 into and out of the plane of the page. Rotating insert(s) 298 moves gas jets 28 closer to linear emitter 20. Since insert(s) 298 is/are not fixedly attached within aperture 27', it may be selectively rotated any amount to change the distance of jet 28 to emitter 20 as well as the right/left hand orientation of same. In certain preferred embodiments, insert(s) 298 may be rotated within manifold aperture 27' between a finite number of discrete and angularly offset positions to thereby change the position of the nozzle relative to the linear ion emitter. This, could be achieved with any of the embodiments shown herein with a detent structure, or by using complementary polygon shaped inserts/apertures, or by any of the many other techniques known in the mechanical arts.

Those of ordinary skill will recognize that any combination of nozzle inserts, 290,293, 293', 293", 296, 298, and/or 298', as well as plugs 294 may be combined in a single ionizing bar for optimal effect without departing from the scope and spirit of the invention.

Performance tests of various embodiments of the invention were performed with an AC powered ionizing bar (substantially similar to those shown and discussed herein as 10' and 10") using various inserts and insert orientations to identify the effect of nozzle position on charge neutralization efficiency (for example, by measuring positive and negative discharge times). The linear emitter used in the test apparatus was a 100 micron tungsten wire positioned between two reference electrodes and connected to pulsed high frequency high voltage power supply.

The tests were performed with single-nozzle eccentric inserts 296 in three clockwise positions: (1) perpendicular to the linear emitter axis or 90 degree (the gas nozzle was at a maximum distance, 3 mm, from the linear emitter); (2) an angle of about 30 degrees to the linear emitter axis (in which case the nozzle was about 1.5 mm, from the linear emitter); (3) an angle of about 0 degrees (parallel with) to the linear emitter axis (in which case the nozzle was about 0 mm). The tested inserts had injection molded nozzles with diameters between about 0.012" and about 0.015" (and an average of 0.0135").

Figure 10:
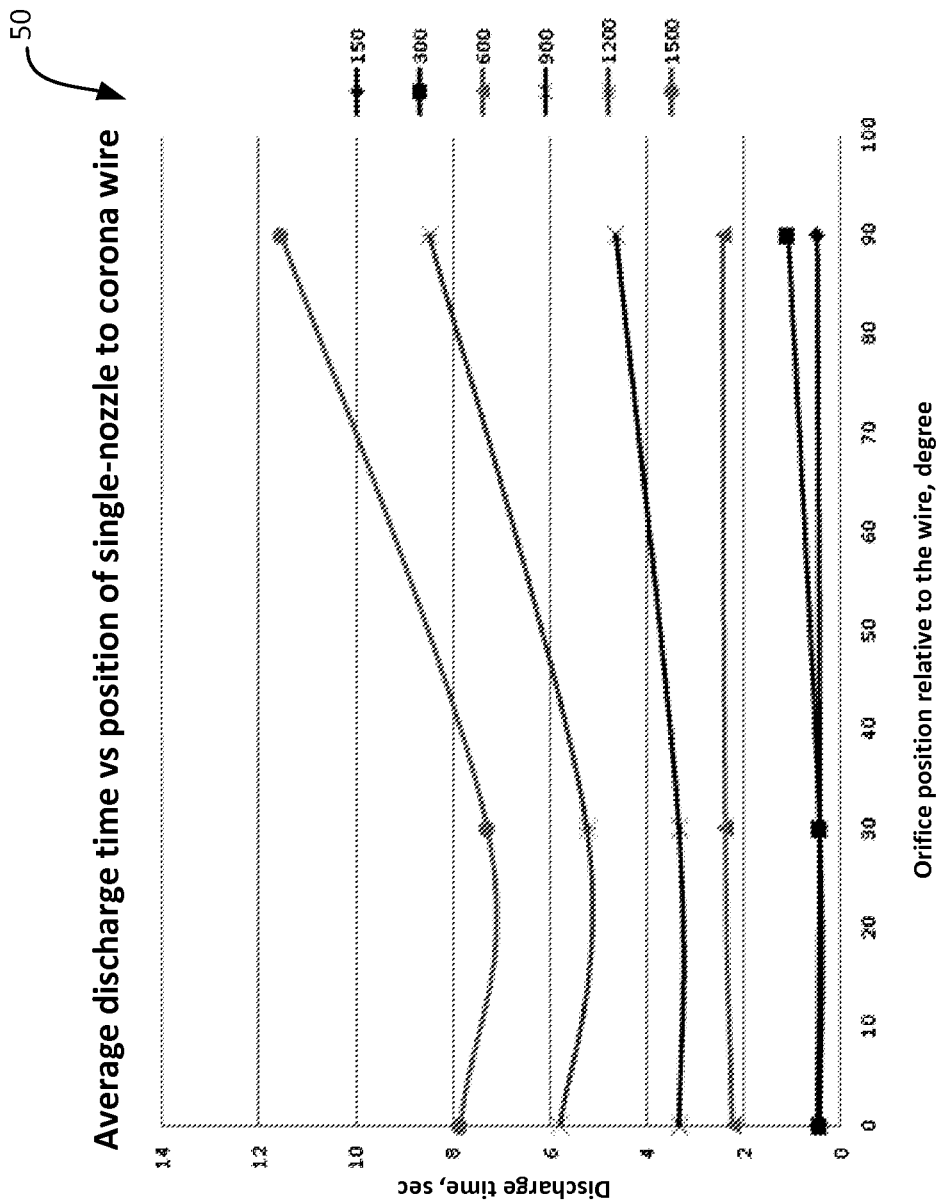
FIG. 10 is a chart illustrating discharge efficiency using single-nozzle inserts under various conditions.

Test results for various target object distances are shown in chart 50 of FIG. 10. As can be seen nozzle position to the linear emitter has relatively little effect on discharge times at short distances (150, 300 and 600 mm) between the bar and target object (in the test apparatus this was a charge plate monitor (CPM)). At these shorter distances, most of the ions generated by linear ion emitter are attracted to CPM plate by the electrostatic field therebetween rather than movement caused by gas streams from the nozzles. However, the significance on discharge times is more noticeable at longer distances: e.g., 900-1500 mm. As shown, average (positive and negative) discharge times are minimized at an orientation of about 20-30 degrees between the linear emitter wire and the nozzle axis (representing a distance of about 1.5 mm between the two).

In particular, FIG. 10 shows that there is an optimum nozzle position (shortest discharge time) at angle about 20-30 degrees. This corresponds to a distance of about 10-15 ion emitter diameters. This distance is close to an edge of the plasma region 22 for the corona discharge surrounding wire emitter. The explanation for this effect is as follows: At short distances (close to surface of the emitter electrode), ion movement is largely controlled by strong the AC electrical field. At distances of 10-15 emitter diameters, the electrical field intensity drops about 10-15 times (field intensity is inversely proportional to distance from wire electrode). Thus, the generated ions become more susceptible to movement under the influence of the gas streams 28. At further distances ion concentration drops as result of recombination and fewer ions are available for harvesting by the gas streams 28.

The tests were also performed with dual-nozzle (6 mm between the two) eccentric inserts 298 in three clockwise positions: (1) perpendicular to the linear emitter axis or 90 degree (the gas nozzle was at a maximum distance, 3 mm, from the linear emitter); (2) an angle of about 30 degrees to the linear emitter axis (in which case the nozzle was about 1.5 mm, from the linear emitter); (3) an angle of about 0 degrees (parallel with) to the linear emitter axis (in which case the nozzle was about 0 mm). The tested inserts had injection molded nozzles with diameters between about 0.012" and about 0.015" (and an average of 0.0135").

Figure 11:
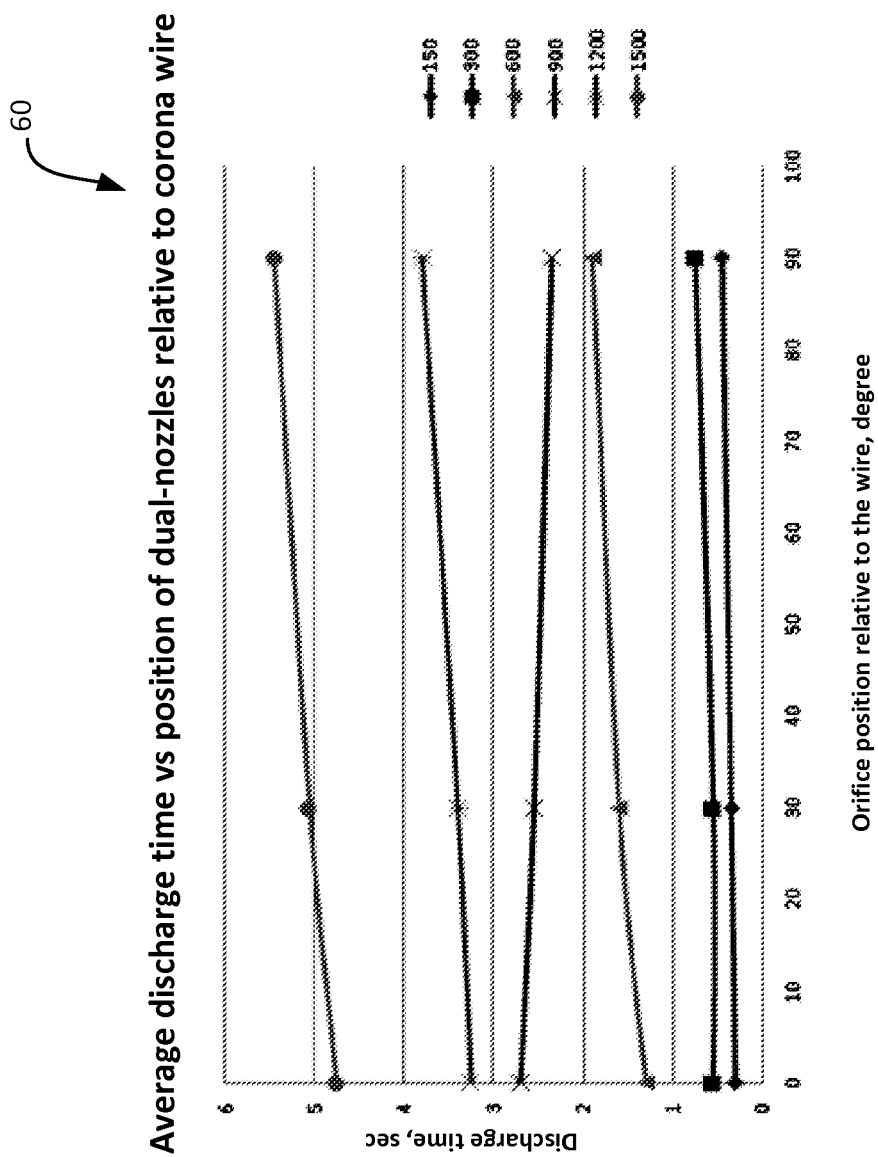
FIG. 11 is a chart illustrating discharge efficiency using dual-nozzle inserts under various conditions.

Test results for various target object distances are shown in chart 60 of FIG. 11. As shown therein, nozzle position relative to the ion emitter has little effect on discharge efficiency. It is believed that this relative insensitivity to nozzle position is due to the fact that the pairs of nozzles create pairs of gas streams surrounding the corona emitter. This in turn urges more ions away from more locations along the emitter (i.e., the greater number of nozzles simply overwhelm the ions leaving the emitter). Naturally, this is achieved at a cost and, in this case, that cost is the consumption of more of the clean/expensive gas (e.g., CDA).

Figure 12:
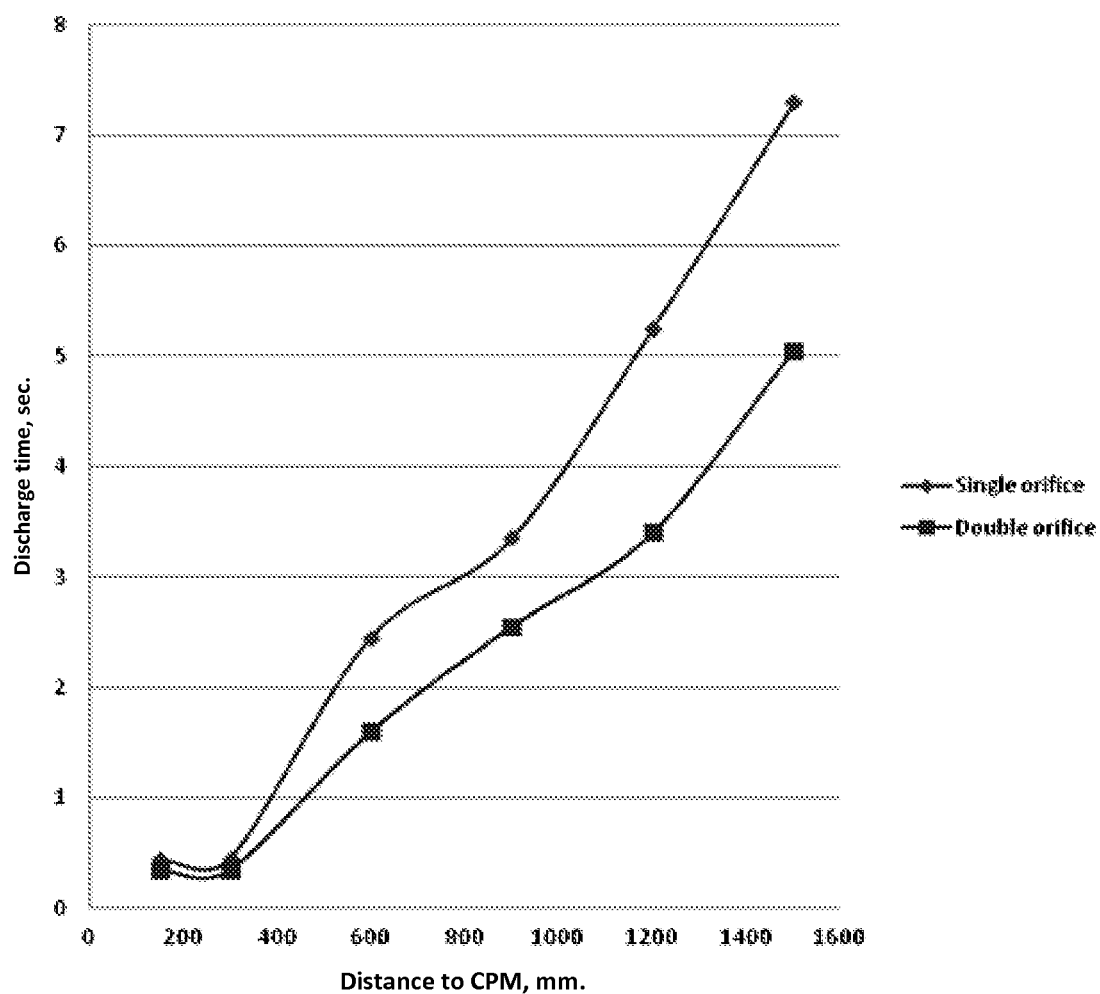
FIG. 12 is a chart comparing discharge efficiency using single-nozzle and dual-nozzle inserts under various conditions.

The chart 70 of FIG. 12 shows a comparison of discharge times for the same bar with single-nozzle inserts and dual-nozzle inserts and is self-explanatory to those of ordinary skill in the art in light of the disclosure contained herein. Note that chart 70 shows that for a constant gas pressure (about –80 psi) and at all distances longer than 300 mm, inserts with double orifices are significantly more efficient. This difference increased for longer distances 600, 900, 1200 and 1500 mm. This positive effect is primarily achieved by moving larger amount of ions from the corona emitter to thereby deliver a strong ionized stream to the target object at the same gas pressures supplied to the bar.

While the present invention has been described in connection with what is presently considered to be the most practical and preferred embodiments, it is to be understood that the invention is not limited to the disclosed embodiments, but is intended to encompass the various modifications and equivalent arrangements included within the spirit and scope of the appended claims. With respect to the above description, for example, it is to be realized that the optimum dimensional relationships for the parts of the invention, including variations in size, materials, shape, form, function and manner of operation, assembly and use, are deemed readily apparent to one skilled in the art, and all equivalent relationships to those illustrated in the drawings and described in the specification are intended to be encompassed by the appended claims. Therefore, the foregoing is considered to be an illustrative, not exhaustive, description of the principles of the present invention.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

What is claimed is:

1. A linear ionizing bar for delivering charged carriers to a charge neutralization target comprising:
   at least one axis-defining linear ion emitter for establishing an ion cloud of charge carriers along the length thereof in response to receipt of an ionizing voltage thereto, the ion cloud having a plasma region with an outer peripheral boundary;
   a reference electrode that presents a non-ionizing electric field within the ion cloud in response to receipt of a non-ionizing voltage, the non-ionizing electric field urging charge carriers to leave the plasma region; and
   a gas flow manifold that receives gas from a source and that has a plurality of manifold apertures with a plurality of inserts received within the manifold apertures, at least some of the inserts having at least one nozzle aperture through which the gas may exit the manifold to thereby direct ions away from the linear ion emitter and toward the charge neutralization target in a configurable ionized gas flow pattern, wherein at least some of the inserts are removable such the ionized gas flow pattern is reconfigurable.

2. The linear ionizing bar of claim 1 wherein some of the inserts are removable and define one nozzle aperture through which the gas may flow, and wherein some of the inserts do not define any nozzle aperture through which the gas may flow.

3. The linear ionizing bar of claim 1 wherein at least one of the nozzle inserts defines two eccentric nozzle apertures through which the gas may flow, wherein the at least one insert has a perimeter that is at least substantially circular, and wherein the at least one insert may be rotated in the manifold aperture within which it is received to change the position of the two nozzle apertures relative to the linear ion emitter.

4. The linear ionizing bar of claim 1 wherein the manifold further comprises a plate which defines the apertures, wherein the inserts are formed of a material with a lower modulus of elasticity than the material of which the aperture-defining plate is formed, and wherein gas pressure within the manifold deforms the inserts to thereby seal the interface between the insert and the aperture-defining plate within which it is received.

5. The linear ionizing bar of claim 1 wherein at least one of the inserts defines one eccentric nozzle aperture through which the gas may flow, wherein the insert has a perimeter that is at least substantially circular, and wherein the insert may be rotated in the manifold aperture within which it is received to change the position of the nozzle aperture relative to the linear ion emitter.

6. The linear ionizing bar of claim 1 wherein at least one of the inserts defines at least one eccentric nozzle aperture through which the gas may flow, and wherein the insert may be rotated in the manifold aperture within which it is received to change the position of the nozzle aperture relative to the linear ion emitter to direct gas flow tangent to the ion cloud.

7. The linear ionizing bar of claim 1 wherein at least one of the inserts defines at least one eccentric nozzle aperture through which the gas may flow, wherein the insert may be rotated in the manifold aperture within which it is received between a finite number of discrete and angularly offset positions to change the position of the nozzle aperture relative to the linear ion emitter.

8. The linear ionizing bar of claim 1 wherein at least one of the inserts defines a nozzle aperture through which the gas may flow, and wherein the nozzle tapers inwardly from an entry end to an opposing exit end.

9. The linear ionizing bar of claim 1 wherein at least one of the manifold apertures defines an axis and the insert received therein has a nozzle aperture that is angled relative to the manifold aperture axis.

10. The linear ionizing bar of claim 9 wherein the insert is integrally formed and further comprises a visual indicator showing the direction of the nozzle aperture relative to the manifold aperture axis.

11. The linear ionizing bar of claim 1 wherein at least one of the manifold apertures defines an axis and the insert received therein has a nozzle aperture that is angled relative to the manifold aperture axis, wherein the nozzle aperture has an exit end, and the insert further comprises a flat surface that surrounds and is perpendicular to the exit end of the nozzle.

12. A reconfigurable ionizing bar for delivering charged carriers to a charge neutralization target comprising:
   at least one ion emitter for establishing an ion cloud of charge carriers in response to the application of an ionizing voltage thereto;
   a reference electrode that presents a non-ionizing electric field within the ion cloud in response to receipt of a non-ionizing voltage being applied thereto, the non-ionizing electric field urging ions to move away from the ion emitter; and
   a manifold that receives pressurized gas and that has a plurality of manifold apertures with a plurality of removable inserts received within the manifold apertures, at least some of the removable inserts having at least one nozzle aperture through which gas may flow, and the plurality of removable inserts being collectively configured to direct ions away from the linear ion emitter and toward the charge neutralization target in a reconfigurable ionized gas flow pattern.

13. The reconfigurable ionizing bar of claim 12 wherein some of the inserts each define one eccentric nozzle aperture through which one of the plural gas streams may flow, and wherein some of the inserts do not define any nozzle apertures through which gas may flow.

14. The reconfigurable ionizing bar of claim 12 wherein at least one of the inserts has a perimeter that is at least substantially circular and defines two eccentric nozzles apertures through which two of the plural gas streams may flow, and wherein the at least one insert may be rotated in the manifold aperture within which it is received to change the position of the plural gas streams exiting the nozzle aperture relative to the ion emitter.

15. The reconfigurable ionizing bar of claim 12 wherein the inserts are formed of a material with a lower modulus of elasticity than the material of which the aperture-defining plate is formed, and wherein gas pressure within the manifold deforms the inserts to thereby seal the interface between the insert and the aperture-defining plate within which it is received.

16. The reconfigurable ionizing bar of claim 12 wherein at least one of the inserts defines one eccentric nozzle aperture through which one of the plural gas streams may flow and has a perimeter that is at least substantially circular, and wherein the insert may be rotated in the manifold aperture within which it is received to change the position of the plural gas stream relative to the ion emitter.

17. The reconfigurable ionizing bar of claim 12 wherein at least one of the inserts defines at least one eccentric nozzle aperture through which one of the plural gas streams may flow, and wherein the insert may be rotated in the manifold aperture within which it is received to change the position of the gas stream exiting the nozzle aperture relative to the ion emitter to direct gas flow tangent to the ion cloud.

18. The reconfigurable ionizing bar of claim 12 wherein at least one of the inserts defines at least one eccentric nozzle aperture through which the gas may flow, wherein the insert may be rotated in the manifold aperture within which it is received between a finite number of discrete and angularly offset positions to change the position of the gas stream exiting the nozzle relative to the ion emitter.

19. The reconfigurable linear ionizing bar of claim 12 wherein at least one of the inserts defines a nozzle aperture through which the gas may flow, and wherein the nozzle tapers inwardly from an entry end to an opposing exit end.

20. The reconfigurable linear ionizing bar of claim 12 wherein at least one of the manifold apertures defines an axis and the insert received therein has a nozzle aperture that is angled relative to the manifold aperture axis.

21. The reconfigurable linear ionizing bar of claim 20 wherein the insert is integrally formed and further comprises a visual indicator showing the direction of the nozzle aperture relative to the manifold aperture axis.

22. The reconfigurable linear ionizing bar of claim 12 wherein at least one of the manifold apertures defines an axis and the insert received therein has a nozzle aperture that is angled relative to the manifold aperture axis, wherein the nozzle has an exit end, and the insert further comprises a flat surface that surrounds and is perpendicular to the exit end of the nozzle.

23. A method of changing the pattern of gas flow exiting a manifold of the type that receives gas from a source and directs the gas past a linear ion emitter to urge charge carriers from the emitter toward a charge neutralization target, the manifold having a plurality of manifold apertures and a plurality of inserts received within the manifold apertures, at least some of the inserts having at least one eccentric nozzle aperture through which the gas may flow and the plurality of inserts being collectively configured in a reconfigurable pattern, the method consisting essentially of:
   rotating at least one of the nozzle inserts without removing the insert from the manifold aperture within which it is received to change the position of the nozzle relative to the linear ion emitter.

24. A method of changing the pattern of gas flow exiting a manifold of the type that receives gas from a source and directs the gas past a linear ion emitter to urge charge carriers from the emitter toward a charge neutralization target, the manifold having a plurality of manifold apertures and a plurality of inserts received within the manifold apertures, at least some of the inserts having at least one nozzle aperture through which the gas may flow and the plurality of inserts being collectively configured in a reconfigurable pattern, the method consisting essentially of:
   removing at least one of the inserts from the manifold aperture within which it is received and inserting another insert into the manifold aperture from which the at least one insert was removed to change insert pattern of the manifold.

* * * * *